INVENTORS
FRED A. PHILLIPS AND
WILBUR R. STEPHENSON
BY
ATT'YS.

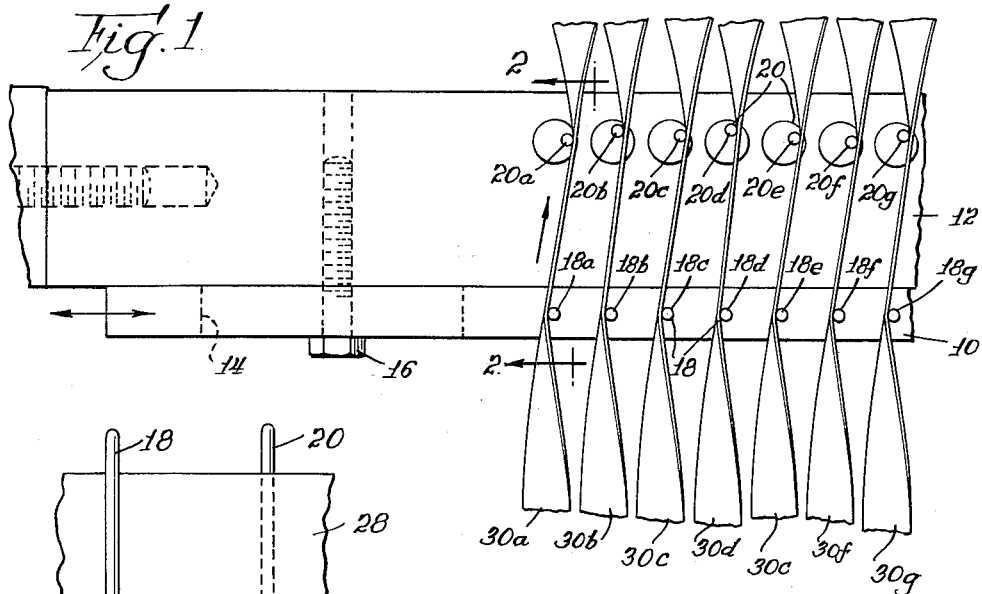
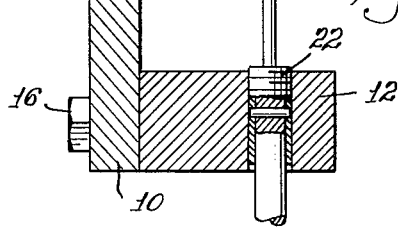
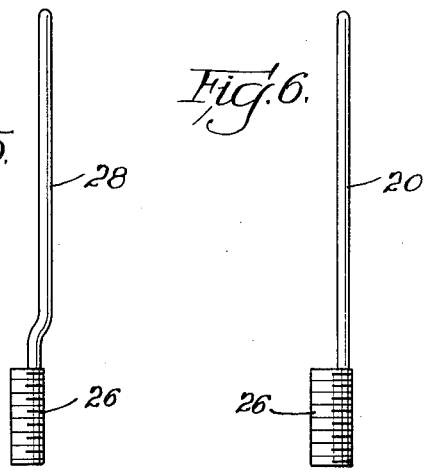
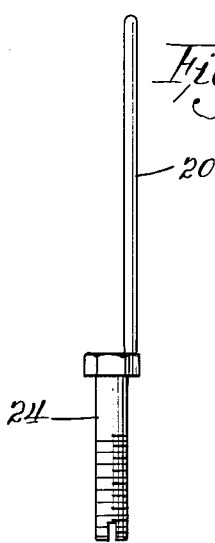
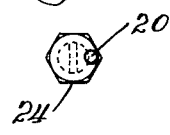

United States Patent Office 3,220,666
Patented Nov. 30, 1965

3,220,666
PRECISION COMB TO GUIDE RIBBONS
Fred A. Phillips, R.F.D. 1, Coleman, Mich., and Wilbur R. Stephenson, 222 E. St. Andrews, Midland, Mich.
Filed June 28, 1963, Ser. No. 291,448
6 Claims. (Cl. 242—76)

This invention relates to apparatus and a method for guiding plastic ribbons toward a grooved roll in a manufacturing process.

In the copending application of Fred A. Phillips (a co-inventor in this application), dated February 1, 1963, Serial No. 258,661, a process is disclosed for preparing filamentary microtapes of labyrinthian cross section. The apparatus involved in said process includes a rotating roll having a plurality of parallel tape shaping grooves formed on the periphery, each groove being adapted to receive a moving tape to shape the tape in accordance with the objectives of the invention.

The present invention relates to a comb-like means for guiding the ribbons into flight paths whereby they will each move into proper engagement with a predetermined groove on the roll. Such accurate guiding is important if the desired tape shaping is to be achieved. The guiding pins of the comb-like means are each individually adjustable at point of usage so that any given ribbon can be accurately guided into a flight path for entry into its recessing groove on the roll. Once the guiding pins are initially adjusted they will maintain their respective settings until readjusted for new tape sizes, or to compensate for pin wear. The invention serves to provide convenient and accurate ribbon flight guiding means whereby a plurality of moving ribbons may be accurately directed toward and into grooves on a rotating roll.

The main object of this invention is to provide apparatus and a method for guiding plastic ribbons toward a grooved roll in a manufacturing process.

A more specific object is to provide individually adjustable ribbon flight guiding means whereby each of a plurality of ribbons may be accurately directed into a predetermined groove on a roll. The adjusting means used will maintain flight guiding position until readjusted to accommodate different size ribbons or to compensate for wear.

A further objective is to provide a guide means wherein convenient and accurate adjustment of ribbon flight is achieved.

These and further objects and features of the invention will become more apparent from the following description and accompanying drawings wherein:

FIG. 1 is a plan view of ribbon flight guiding means embodying the principles of the invention;

FIG. 2 is a section view generally as seen along line 2—2 in FIG. 1;

FIG. 3 illustrates a first type ribbon guide pin used in the apparatus of FIG. 1, and showing the manner of mounting in a bolt to achieve the adjustability desired;

FIG. 4 is a top end view of the same;

FIG. 5 illustrates a second form of ribbon guide pin having an offset;

FIG. 6 illustrates a third form of ribbon guide pin;

FIG. 7 is an end view of the same;

Figure 8:
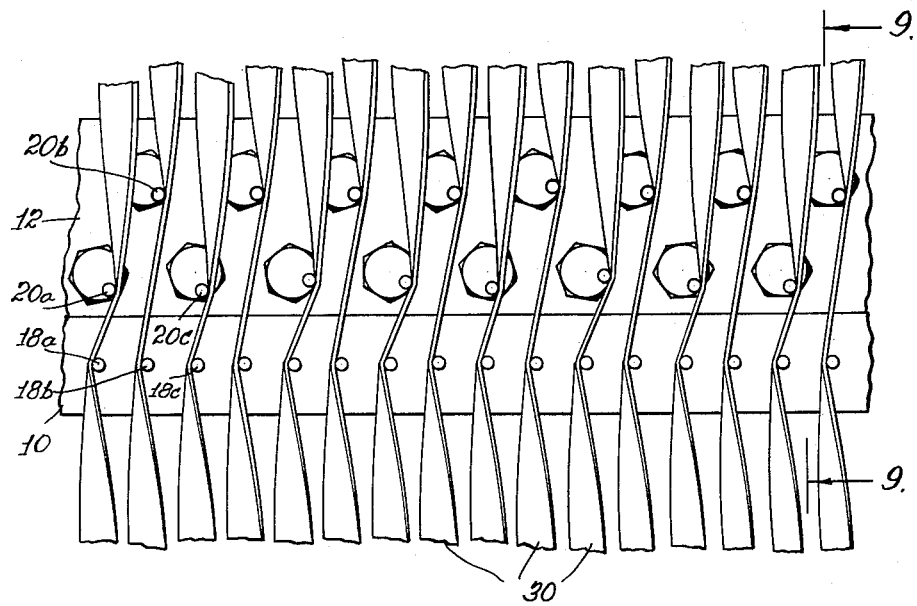
FIG. 8 is a plan view of a second type of ribbon flight guiding means embodying the principles of the invention.

Referring now to the drawings, a ribbon guide comb arrangement is illustrated in FIG. 1, which includes a longitudinally adjustable comb bar 10, and a fixed comb bar 12. The bar 10 has a slot 14 at each end (one shown) whereby the bar may be adjustably mounted to the bar 12 by means of a bolt 16. The comb arrangement is positioned between a cutter and a grooved roll (neither shown) in an operational setup, so that the ribbons coming from the cutter are guided on the grooved roll in proper alignment with the grooves thereupon.

A plurality of fixed pins 18 are mounted upon the bar 10 and project upwardly in a plane. A plurality of adjustable pins 20 of like number to the pins 18, are mounted in the bar 12 and project upwardly. Each pin 20 is secured to a threaded member 22 which may be in the form of a bolt 24 (FIG. 3), or a headless bolt 26 (FIGS. 5 or 6). A modified pin 28 (FIG. 5) is shown wherein the pin axis is offset at the lower end of the pin to provide somewhat greater control range, as compared with the pin 20. The pins 20 or 28, as the case may be, are mounted off-center on the threaded supporting member 24 or 26, so that the vertical spacial relationship between each pin 20 and its related pin 18, as indicated by corresponding letter suffixes, that is, the span between the vertical planes perpendicular to the threaded supporting member 24 or 26 in which each pin 20 and its related pin 18 lie, may be varied for ribbon flight control, as will now be explained.

Assume that a plurality of ribbons 30, moving in the direction of the arrow are to be guided into a grooved roll (not shown); as best seen in FIG. 1, each ribbon 30 is arranged so that one side thereof will engage a pin 18 on the left-hand side of the pin, and the opposite side of the ribbon will engage an adjustable pin 20 on the right-hand side thereof. The pins 20 are each adjusted so that a ribbon in contact therewith, will be guided into proper engaging relationship with its receiving groove on the grooved roll. It will be noted each set of two cooperating pins, i.e., 18a and 20a, 18b and 20b, etc., will exert a force upon the ribbon in contact therewith in a direction generally normal to the side surfaces of the ribbon. In such manner, the flight path of each ribbon will be under constant control of the pins.

Figure 9:
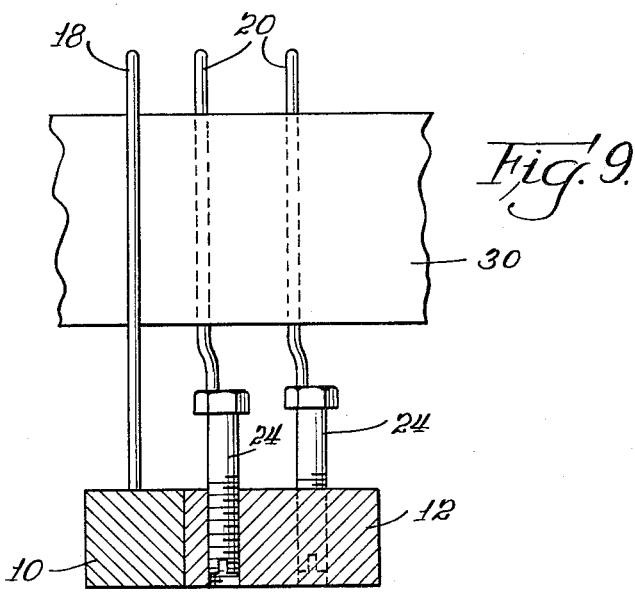
FIG. 9 is a section view generally as seen along line 9—9 in FIG. 8.

The ribbon guide comb arrangement shown in FIGS. 8 and 9, is identical with that of FIG. 1, except that two rows of adjustable pins 20 are used, each adjustable pin, of course, having a cooperating fixed pin 18. The arrangement shown in FIG. 8 will provide the same function as the arrangement of FIG. 1, however, it affords approximately double the capacity without proportioned increase in space requirement. As such, it will be of interest for use in situations wherein increased handling capacity is desired.

It will be apparent from the foregoing that either of the two embodiments disclosed will satisfy the objectives of the invention.

The foregoing description has been given in detail without thought of limitation since the inventive principles involved are capable of assuming other forms without departing from the spirit of the invention or the scope of the following claims.

What is claimed is:

1. A ribbon guide comb arrangement comprising in combination, a member having a plurality of equispaced fixed pins projecting therefrom in the same direction, and a member having a plurality of adjustable pins of like number to said fixed pins and projecting in the same direction as the fixed pins, said fixed pins and said adjustable pins being arranged to cooperate in sets, each adjustable pin being eccentrically mounted and individually rotatable to vary the vertical spacial relationship relative to its associated fixed pin.

2. A ribbon guide comb arrangement comprising in combination, an elongated member having a plurality of equi-spaced fixed pins projecting therefrom in the same direction, and an elongated member having a plurality of adjusatble pins of like numbers to said fixed pins and projecting in the same direction as the fixed pins, said fixed pins and said adjustable pins being arranged to cooperate in sets each adjustable pin being eccentrically mounted and indiivdually rotatable to vary the vertical spacial relationship relative to its associated fixed pin, said members being arranged for adjustable relative longitudinal positioning.

3. A ribbon guide comb arrangement comprising in combination, a first bar having a plurality of equi-spaced fixed pins arranged in the same vertical plane and projecting in the same direction, and a second bar having a plurality of adjustable pins of like number to said fixed pins and projecting in the same direction as the fixed pins, said fixed pins and said adjustable pins being arranged to cooperate in sets, each adjustable pin being eccentrically mounted and individually rotatable to vary the vertical spacial relationship relative to its associated fixed pin, said first bar being arranged for longitudinal adjustment relative to second bar.

4. In a ribbon guide comb arrangement according to claim 3, wherein said adjustable pins are each affixed in off-center manner to a threaded member arranged for rotatable mounting in the second bar.

5. In a ribbon guide comb arrangement according to claim 3, wherein each adjustable pin is affixed in off-center manner to a threaded member arranged for rotatable mounting in the second bar, each of said pins having an off-set portion at the lower end thereof.

6. In a method for guiding a plurality of ribbons toward a singular roll with a plurality of grooves therein whereby each ribbon enters one of said grooves and whereby adjustment may be made between said ribbons and said grooves for proper engagement therewith comprising the steps of moving each of said plurality of ribbons over one of a plurality of first members mounted stationary on a longitudinally adjustable comb bar, and then moving each of said plurality of ribbons over a plurality of second members mounted on a fixed bar in an individually rotatable eccentric manner, moving said comb bar longitudinally to move each of said plurality of ribbons with respect to said plurality of second members, and individually rotating each of said second members to vary the vertical spatial relationship between each of said ribbons and each of said grooves in said roll.

References Cited by the Examiner
UNITED STATES PATENTS

| | | | |
|---|---|---|---|
| 192,962 | 7/1877 | Baker | 242—75.2 |
| 1,140,460 | 5/1915 | Jaeger | 242—75.2 |
| 2,194,879 | 3/1940 | Mihaly et al. | 242—76 |
| 2,692,736 | 10/1954 | Hanley | 242—76 |
| 3,083,925 | 4/1963 | Schoebel | 242—55.13 |

MERVIN STEIN, *Primary Examiner.*